United States Patent [19]

Aizawa

[11] Patent Number: 4,912,483

[45] Date of Patent: Mar. 27, 1990

[54] BALANCED HEAD SUSPENSION IN THERMAL RECORDERS

[75] Inventor: Isamu Aizawa, Fujisawa, Japan

[73] Assignee: Graphtec Kabushiki Kaisha, Tokyo, Japan

[21] Appl. No.: 257,982

[22] Filed: Oct. 14, 1988

Related U.S. Application Data

[63] Continuation of Ser. No. 227,685, Aug. 3, 1988, Pat. No. 4,855,755.

[30] Foreign Application Priority Data

| | | | |
|---|---|---|---|
| Oct. 22, 1987 | [JP] | Japan | 62-266969 |
| Oct. 22, 1987 | [JP] | Japan | 62-266970 |
| Jun. 14, 1988 | [JP] | Japan | 63-146090 |

[51] Int. Cl.[4] ............ G01D 9/00

[52] U.S. Cl. ............ 346/1.1; 346/76 PH; 346/139 R; 400/120; 400/82

[58] Field of Search ............ 346/1.1, 139 R, 76 PH, 346/145; 400/120 PH, 82

[56] References Cited

U.S. PATENT DOCUMENTS

| | | | |
|---|---|---|---|
| 3,689,937 | 9/1972 | Phillips et al. | 346/76 R |
| 3,774,226 | 11/1973 | Ballinger et al. | 346/35 |
| 3,792,481 | 2/1974 | Nagashima et al. | 346/76 R |
| 3,815,144 | 6/1974 | Aiken | 346/76 R |
| 3,840,878 | 10/1974 | Houston et al. | 346/76 R |
| 3,877,035 | 4/1975 | Miller et al. | 346/139 R |
| 3,971,041 | 7/1976 | Mason | 346/76 R |
| 3,980,169 | 9/1976 | Decker et al. | 197/55 |
| 4,038,664 | 7/1977 | Muir | 346/1 |
| 4,074,273 | 2/1978 | Dupree et al. | 346/34 |
| 4,085,407 | 4/1978 | Stratbucker et al. | 346/76 R |
| 4,096,484 | 6/1978 | Ferre et al. | 346/33 EC |
| 4,119,974 | 10/1978 | Ondis et al. | 346/145 |
| 4,134,062 | 1/1979 | Pizzuti et al. | 324/125 |
| 4,145,698 | 3/1979 | Wysong | 346/139 R |
| 4,151,397 | 4/1979 | Boor, Jr. et al. | 219/216 |
| 4,168,505 | 9/1979 | Gaskill, Jr. et al. | 346/76 R |
| 4,205,395 | 5/1980 | Shortridge | 346/76 PH |

(List continued on next page.)

FOREIGN PATENT DOCUMENTS

| | | |
|---|---|---|
| 54-159928 | 11/1979 | Japan . |
| 55-97976 | 7/1980 | Japan . |
| 55-156080 | 12/1980 | Japan . |
| 58-31022 | 2/1983 | Japan . |
| 60-29990 | 7/1983 | Japan . |

OTHER PUBLICATIONS

Thermal Printer with In-Memory Scan-Line Composition, IBM Technical Disclosure Bulletin, vol. 22, No. 5, Oct., 1979, p. 2022.

Collier's Encyclopedia, The Crowell-Collier Publishing Company, 1962, vol. 8, pp. 226 and 232.

*Primary Examiner*—B. A. Reynolds
*Assistant Examiner*—Huan Tran
*Attorney, Agent, or Firm*—Benoit Law Corporation

[57] ABSTRACT

Information is recorded with one or more elongate thermal recording heads on a recording medium advancing at least intermittently on a recording medium support. Such recording head or heads are being pressed against the recording medium at the recording medium support by at least two biasing devices spaced along such elongate thermal recording head or heads. These two biasing devices are balanced relative to each other opposite the elongate thermal recording head or heads, as seen from the recording medium support. Different characteristics of the biasing devices are thus compensated opposite the elongate thermal recording head or heads, as seen from said recording medium support. Forces acting at one end of an elongate thermal recording head, or acting on one of the recording heads, against either of the biasing devices are transmitted via both biasing devices to an opposite end of that elongate thermal recording head or to the other of two elongate thermal recording heads. Movements of the recording medium support at either end of one elongate thermal recording head, or at one of the recording heads, are transmitted via the biasing devices to an opposite end of that elongate thermal recording head or to the other of two elongate thermal recording heads for perfect balance.

24 Claims, 5 Drawing Sheets

U.S. PATENT DOCUMENTS

| | | | |
|---|---|---|---|
| 4,211,992 | 7/1980 | Gaskill, Jr. | 335/222 |
| 4,262,336 | 4/1981 | Pritchard | 364/474 |
| 4,332,193 | 6/1982 | Noyes | 101/93.01 |
| 4,369,452 | 1/1983 | Anno et al. | 346/76 PH |
| 4,393,386 | 7/1983 | DiGiulio | 346/75 |
| 4,425,571 | 1/1984 | Mueller et al. | 346/136 |
| 4,426,651 | 1/1984 | Mueller et al. | 346/136 |
| 4,442,442 | 4/1984 | O'Dell | 346/136 |
| 4,447,819 | 5/1984 | Moriguchi et al. | 346/76 PH |
| 4,455,578 | 6/1984 | Fearnside | 358/302 |
| 4,456,951 | 6/1984 | Henneberger et al. | 364/131 |
| 4,462,704 | 7/1984 | Kurata et al. | 346/76 PH |
| 4,504,906 | 3/1985 | Itaya et al. | 364/200 |
| 4,536,778 | 8/1985 | DeSchamphelaere et al. | 346/160 |
| 4,574,293 | 3/1986 | Inui et al. | 346/76 PH |
| 4,590,488 | 5/1986 | Sullivan | 346/76 PH |
| 4,595,303 | 6/1986 | Kuzuya et al. | 400/82 |
| 4,595,935 | 6/1986 | Brooks et al. | 346/76 PH |
| 4,607,262 | 8/1986 | Moriguchi et al. | 346/76 PH |
| 4,660,052 | 4/1987 | Kaiya et al. | 346/76 PH |
| 4,739,344 | 4/1988 | Sullivan et al. | 346/76 PH |

BALANCED HEAD SUSPENSION IN THERMAL RECORDERS

This is a continuation of my application Ser. No. 07/227,685, filed Aug. 3, 1988, now U.S. Pat. No. 4,855,755, issued Aug. 8, 1989.

BACKGROUND OF THE INVENTION

1. Field of the Invention

The subject invention relates to thermal recording with thermal recording heads including a plurality of clocked heating elements and, more specifically, to new suspension systems for such heads in thermal recorders, and also to head biasing or pressing mechanisms and systems.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose of providing antecedents for the remainder of a statement of invention or claim.

Efforts to provide operable and efficient recorders with thermal printheads have been of long standing and were to no small part prompted by inadequacies of moving coil galvanometer-type recording apparatus, which have inherent limitations despite various improvements, including those disclosed in U.S. Pat. No. 4,134,062, by Pizzuti et al, issued Jan. 9, 1979 to Atlan-Tol Industries, Inc., for a limited rotation instrument rebalance apparatus employing a wiper having vibration damping, and U.S. Pat. No. 4,211,992, by D. M. Gaskill, Jr., issued July 8, 1980 to Atlan-Tol Industries, Inc., for positioning means for a limited rotation motor.

For an example of a moving coil thermal recorder, reference may be had to U.S. Pat. No. 3,689,937, by Phillips et al, issued Sept. 5, 1972 to Evershed & Vignoles Limited, for thermal recording styli and control circuits therefor.

The development of thermal recorders also has benefited from the development of transverse recorders as disclosed, for instance, in U.S. Pat. No. 3,774,226, by Ballinger et al, issued Nov. 20, 1973 to Honeywell Inc., and disclosing a plurality of recording elements arranged across the recording medium to define a transverse recording line.

Thermal recording media also developed into different forms as may, for instance, be seen from U.S. Pat. No. 3,792,481, by Nagashima et al, issued Feb. 12, 1974 to Canon K.K., for recording by heat sensitive multicolor indication, disclosing suitable heat sensitive materials.

An array of heat producing elements is disclosed in U.S. Pat. No. 3,815,144, by H. H. Aiken, issued June 4, 1974, for Thermal Recorder Having an Analogue to Digital Converter. In this respect, an analog-to-digital converter for a magnetic transverse recorder was disclosed in the above mentioned Ballinger et al U.S. Pat. No. 3,774,226.

A computer controlled chart advance is disclosed in U.S. Pat. No. 3,840,878, by Houston et al, issued Oct. 8, 1974 to Texas Instruments Incorporated, for a dual mode thermal recorder. An event marker for graphic recorders has been disclosed in U.S. Pat. No. 3,877,035, by Miller et al, issued Apr. 8, 1975 to Leeds & Northrup Company, and showing also a print element suspension. Another print element suspension is shown in U.S. Pat. No. 3,980,169, by Decker et al, issued Sept. 14, 1976 to Triumph Werke Nurnberg A.G., for an impact control for a single element printer.

A chart recorder using a fixed thermal printhead is disclosed in U.S. Pat. No. 3,971,041, by C. F. Mason, issued July 20, 1976 to Esterline Corporation, and disclosing a marginal array of heat generating dots in addition to a single row of heat generating dots along the printhead. A recording control or chart lock is disclosed in U.S. Pat. No. 4,038,664, by A. R. Muir, issued July 26, 1977 to The PerkinElmer Corporation. A sequential value multi-point recording device with unidirectional scan is disclosed in U.S. Pat. 4,074,273, by Dupree et al, issued Feb. 14, 1978 to The Dow Chemical Company.

Even after the development of thermal printheads, resort still was had to the use of mechanical recording styli as may, for instance, be seen from U.S. Pat. No. 4,085,407, by Stratbucker et al, issued Apr. 18, 1978 to Health Technology Laboratories, Inc., and U.S. Pat. No. 4,096,484, by Ferre et al, issued June 20, 1978 to Edo Western Corporation, for a graphic recording system including a plurality of memories for storing information received over different channels for recording with different recording devices.

The recording apparatus disclosed in U.S. Pat. No. 4,119,974, by Ondis et al, issued Oct. 10, 1978 to Atlan-Tol Industries, Inc., employed both a thermal recording head and a thermal recording stylus.

A real breakthrough is apparent from U.S. Pat. No. 4,145,698, by R. D. Wysong, issued Mar. 20, 1979 to Shakespeare Marine Electronics, Inc., and subsequently assigned to Holly Springs of Florida Incorporated, and by them to the common assignee of the entire interest hereof. In particular, that Wysong patent shows a thermal printhead biasing arrangement using, in its own words, a helical compression spring for biasing at least one thermal printhead into tangential contact with the thermal printing paper. That Wysong patent also discloses an arrangement of two thermal printheads in substantially aligned, substantially abutting end-to-end relation with each other so that the longitudinal dimensions of these printheads are in substantially transverse relation to the chart at the printing station and so that the printheads engage that chart on the opposite side thereof from the chart advancing means. That Wysong patent also discloses mounting means independently mounting the first and second printheads so that they are independently movable toward the chart. The helical compression springs are also arranged in this Wysong patent for independently biasing the first and second printheads towards the chart. Independent biasing of several thermal printheads with helical compression springs has also been disclosed in U.S. Pat. No. 4,151,397, by Boor, Jr. et al, issued Apr. 24, 1979 to E-Systems, Inc.

A thermal recording stylus usable in the above mentioned Ondis et al U.S. Pat. No. 4,119,974 was subsequently disclosed in U.S. Pat. No. 4,168,505, by Gaskil, Jr. et al, issued Sept. 18, 1979 to Atlan-Tol Industries, Inc.

Microprocessor-controlled multiple-head thermal recorders have been disclosed by Markson et al, in an illustrated article entitled Thermal Printer with In-Memory Scan-Line Composition in the IBM Technical Disclosure Bulletin, Vol. 22, No. 5 (Oct. 1979), p. 2022, and in U.S. Pat. No. 4,205,395, by E. J. Shortridge, issued May 27, 1980 to Shakespeare Marine Electronics, Inc.

U.S. Pat. No. 4,262,336, by E. K. Pritchard, issued Apr. 14, 1981 for a Multi-Axis Contouring Control System in which a host computer and multi-processor system is shared with a master controller, and a slave controller controlled by part of the master controller.

A thermal line printer with a plurality of printheads has also been disclosed in U.S. Pat. No. 4,332,193, by B. P. Noyes, issued June 1, 1982. A thermal recording head and a drive therefor have been disclosed in U.S. Pat. No. 4,369,452, by Anno et al, issued Jan. 18, 1983 to Tokyo Shibaura Denki K.K.

U.S. Pat. No. 4,393,386, by P. C. Di Giulio, issued July 12, 1983 to Pitney Bowes, Inc., for Ink Jet Printing Apparatus also discloses application of the above mentioned host computer, multi-processor, master and slave controller system to printing apparatus.

U.S. Pat. No. 4,425,571, by Mueller et al, issued Jan. 10, 1984 and U.S. Pat. No. 4,426,651, by Muellner et al, issued Jan. 17, 1984, both to The Perkin-Elmer Corporation, also show control of the chart advance from a microprocessor. A data synchronization system for graphic recording apparatus has been disclosed in U.S. Pat. No. 4,442,442, by G. B. O'Dell, issued Apr. 10, 1984 to Tektronix, Inc.

U.S. Pat. No. 4,447,819, by Moriguchi et al, issued May 8, 1984 to Fuji Xerox Co., Ltd., discloses thermal recording apparatus including a control for determining a number of blocks to be simultaneously driven to perform recording without exceeding the capacity of the power source.

U.S. Pat. No. 4,455,578, by W. T. Fearnside, issued June 19, 1984 to Eastman Kodak Company, for Electronics for Arrayed Photosources discloses controlled circuitry in which each sub-array of LED recording devices was controlled by its own control assembly governed by a sequence controller with the aid of clock generator circuits. That patent also discloses replacement of a prior-art print enable signal by binary weighted pulses derived from clock generator circuits, which also supply a shift frequency pulse train instead of the prior-art weighted frequency clock. This could easily be implemented as a master/slave control arrangement of the type employed for millions of years. In particular, it became known some time ago that the so-called "second brain" of the kind of dinosaur called "Stegosaurus" actually was an enlargement of the spinal chord in the hip region which, in turn, was controlled from the actual brain in the head through the spinal chord. In other words, the enlargement of the spinal chord in the hip region actually was a slave of the master controller in the head brain that also included the host computer which processed the sensory signals received from the eyes, ears and other sensors and which applied corresponding signals to the "master controller" for energizing the fore part of the animal and for actuating the "slave controller" in the hip region to energize the hind portion of the animal. Reference may in this respect be had to COLLIER'S ENCYCLOPEDIA (The Crowell-Collier publishing Company, 1962), Vol. 8, pp. 226 and 232.

Numerical machine tool controls also employ several processors and monitoring circuits as may, for instance, be seen from U.S. Pat. No. 4,456,951, by Henneberger et al, issued June 26, 1984 to Siemens Aktiengesellschaft.

U.S. Pat. No. 4,462,704, by Kurata et al, issued July 31, 1984 to Fuji Xerox Co., Ltd., discloses a thermal head driving system with selective energization of printheads in parallel relation. U.S. Pat. No. 4,504,906, by Itaya et al, issued Mar. 12, 1985 to Anritsu Electric Company Limited discloses a multiprocessor system comprising a plurality of central processing units periodically and cyclically enabled to access a bus for data transfer from one unit to another.

U.S. Pat. No. 4,536,778, by De Schamphelaere et al, issued Aug. 20, 1985 to AGFA-Gevaert N.V., discloses recording apparatus with modular LED arrays of higher production yield.

Appropriate control of the heat of thermal heads can be an important factor, as may be seen from U.S. Pat. No. 4,574,293, by Inui et al, issued Mar. 4, 1986 to Fuji Xerox Co, Ltd., for a compensation for heat accumulation in a thermal head, and U.S. Pat. No. 4,590,488, by M. J. Sullivan, issued May 20, 1986 to Astro-Med, Inc., for a circuit for controlling energization of a thermal print head.

An example of different controls for printing apparatus may also be seen from U.S. Pat. No. 4,595,303, by Kuzuya et al, issued June 17, 1986 to Brother Kogyo K.K., for printing apparatus with two print heads. A system for detecting defective thermal printhead elements has been disclosed in U.S. Pat. No. 4,595,935, by Brooks et al, issued June 17, 1986 to NCR Canada Ltd.

U.S. Pat. No. 4,607,262, by Moriguchi et al, issued Aug. 19, 1986 to Fuji Xerox Co., Ltd., discloses a thermal head drive circuit and describes a transfer-type heat sensitive recording medium responsive to selective energization of the thermal printhead for selectively producing markings on a chart or an ordinary sheet of paper.

U.S. Pat. No. 4,660,052, by Kaiya et al, issued Apr. 21, 1987, for heat sensitive recording apparatus discloses a plurality of elongate thermal printheads mounted so that the longitudinal dimension thereof are in substantially transverse relation to the recording chart at the printing station and at fixed positions in the transverse extent of the chart. As disclosed in that patent, the printheads are disposed adjacent different longitudinally extending sections of the chart and cooperate to define a substantially continuous printing width which extends substantially across the width of the chart at the printing station.

Japanese Utility Model Publication 54-1-159928, by Motoo Kuroiwa et al, Hokuso Kaihatsu Tetsudo K.K., published Nov. 8, 1979, discloses a thermal dot printer in which heads are alternatively energized.

Japanese Pat. Publication 55-97976, by Wakabayashi et al, Japanese National Railways and Nihon Singo K.K., published July 25, 1980 discloses a thermal printer wherein several printheads are mounted side by side and are independently biased from each other. In one embodiment, the thermal printheads are mounted on a crankshaft having a crank so that the thermal heads are collectively moved up and down when the crankshaft is driven by an electric motor. Another embodiment provides a slight play or gap in a junction between each of the thermal heads and the crankshaft, and pressure is exerted on the thermal head by use of compression springs. However, freedom of each thermal head at its supporting portion is excessively limited, since there is only a slight play or gap in the junction between each thermal head and the crankshaft.

Japanese Pat. Publication 55-156080, by Shinshu Seiki Co., Ltd. et al, published Dec. 4, 1980, discloses a different approach in which one or two thermal heads are reciprocated transversely of the recording paper. That Pat. Publication also shows circuitry for effecting and controlling the energization of the two thermal printheads.

Japanese Pat. Publication 58-31022, by T. Dobashi, Nippon Denshin Denwa Kosha, published Feb. 24, 1983, discloses a processor controlling system having a common memory of a main control processor and a processor to be controlled, and a control circuit for sending out control signals to the processor to be controlled, in accordance with a control order from the main control processor.

Japanese Pat. 60-29990, issued from Japanese Pat. Publication 58-112170, by H. Takatsudo, Casio Keisanki K.K., published July 4, 1983, discloses an electronic register with automatic load control circuitry.

For a summary of the prior art, reference may be had to the recently issued U.S. Pat. No. 4,739,344, by Sullivan et al, issued Apr. 19, 1988 to Astro-Med, Inc., for a chart recorder having multiple thermal printheads mounted so that the longitudinal dimensions thereof are in substantially transverse relation to the chart at the printing station and at fixed positions in the transverse extent of the chart. That Sullivan et al patent also claims, but does not otherwise disclose, the printheads being disposed adjacent different longitudinally extending sections of the chart and cooperating to define a substantially continuous printing width which extends substantially across the width of the chart at the printing station, as disclosed in the above mentioned Kaiya et al U.S. Pat. No. 4,660,052.

That Sullivan et al patent also shows and describes the mounting of elongate printheads in substantially aligned, substantially abutting end-to-end relation with each other so that the longitudinal dimensions of the elongate printheads are in substantially transverse relation to the chart, as disclosed, for instance, in the above mentioned Wysong U.S. Pat. No. 4,145,698 and in the above mentioned IBM Technical Disclosure Bulletin Publication by Markson et al. That Sullivan et al patent also describes and shows the kind of independent biasing of each recording head disclosed in the above mentioned Wysong U.S. Pat. No. 4,145,698, Boor et al U.S. Pat. No. 4,151,397, and Wakabayashi et al Japanese Pat. Publication 55-97976. That Sullivan et al patent also describes and shows microprocessor control systems including a master/slave control of the above mentioned kind applied to energization of two thermal printheads.

In any case of the aforementioned conventional mounting techniques, head supporting mechanisms are attached to the respective thermal heads in one-to-one correspondency. There arises therefore a problem in that it is difficult to make the contacting property between the respective thermal heads and recording paper uniform. At least, it has been necessary to keep the associated constituent parts with high accuracy, in an effort to establish and maintain uniform contact between each thermal head and the recording paper.

However, it is very difficult in practice to obtain several compression springs exactly having the same size and same characteristic, especially same strength. The attempt to produce compression springs of the same size and same characteristic is attendant on various troublesome manufacturing problems.

This is particularly troublesome if each elongate thermal recording head is biased by three compression springs, each of which acts against a fixed bracket, and if the recording heads are biased independently of each other on the one hand, but are arranged side by side to constitute in effect one transverse thermal recording facility as in the latter Sullivan et al patent. In that case, the supposedly unified transverse recording facility is easily broken up into the independently biased recording head segments by practically unavoidable tolerances or variations in effective diameter, circumference and run of the rotary platen, which manifest themselves differently at different locations along that platen, and which tend to degrade the uniformity of the recording paper run and the quality of the thermal printing process.

SUMMARY OF THE INVENTION

It is a general object of this invention to overcome the disadvantages and to meet the needs expressed or implicit in the above Information Disclosure Statement or in other parts hereof.

It is a germane object of this invention to improve performance and operation of information recording apparatus employing thermal recording heads.

It is a related object of this invention to compensate factors affecting performance of thermal recorders, including different forces acting on different locations of elongate thermal recording heads, different characteristics of head biasing devices, and different movements or uneven runs of recording medium supports or platen.

It is also an object of this invention to preserve the integrity of a recording medium facility composed of elongate recording heads arranged lengthwise side by side.

It is a related object of this invention to prevent recording heads arranged side by side to constitute one recording facility across the recording medium, from breaking up into two or more independently acting heads.

It is also an object of this invention to provide improved head pressing mechanisms and systems.

Other objects of the invention will become apparent in the further course of this disclosure.

From one aspect thereof the invention resides in methods and apparatus for recording information with at least one elongate thermal recording head on a recording medium advancing at least intermittently on a recording medium support, and being pressed against the recording medium at the recording medium support by at least two biasing devices spaced along said thermal recording head. In combination with such elongate thermal recording head, recording medium support and biasing devices, the invention interdependently balances the two biasing devices relative to each other at a side opposite the elongate thermal recording head, as seen from said recording medium support, such as with a balancer movable relative to a fixed support and connected to the two biasing devices on that opposite side.

From a related aspect thereof the invention resides in methods and apparatus for recording information with at least two elongate thermal recording heads on a recording medium advancing at least intermittently on a recording medium support. These elongate thermal recording heads extend in substantially transverse relation to the recording medium and at substantially fixed positions in a transverse extent of the recording medium. In combination with these recording means, the invention resides in interdependently biasing the elongate thermal recording heads against the recording medium at the recording medium support with first biasing means for one of the recording heads and with second biasing means for another of the recording heads, and balancing these first and second biasing means relative to each other opposite the elongate thermal recording heads, as seen from the recording medium support, such as with a balancer movable relative to a fixed support and connected to the first and second biasing means on that opposite side.

From a related aspect thereof the invention resides in apparatus for recording information with at least two elongate thermal recording heads on a recording medium advancing at least intermittently on a recording medium support, such elongate thermal recording heads extending in substantially transverse relation to the recording medium and at substantially fixed positions in a transverse extent of the recording medium, and being pressed against the recording medium by first and second biasing means, respectively, such first biasing means including first and second biasing devices spaced along one of said elongate thermal recording heads, and such second biasing means including third and fourth biasing devices spaced along another of said elongate thermal recording heads. The invention according to this aspect resides in the improvement comprising, in combination with said thermal recording heads, recording medium support and biasing means, a first balancer connected to the first and second biasing devices opposite one of the elongate thermal recording heads, as seen from the recording medium support, a second balancer connected to the third and fourth biasing devices opposite another of the elongate thermal recording heads, as seen from the recording medium support, and a third balancer connected to the first and second balancers.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

The drawings illustrate methods and apparatus for recording information with at least one elongate thermal recording head 2 on a recording medium 12 advancing at least intermittently on a recording medium support 1. Each elongate thermal recording head 2 is pressed against the recording medium 12 at the recording medium support 1 by at least two biasing devices 3 spaced along that elongate thermal recording head, as shown by way of example in FIGS. 1, 2A, 2B, and 4.

Figure 2A:
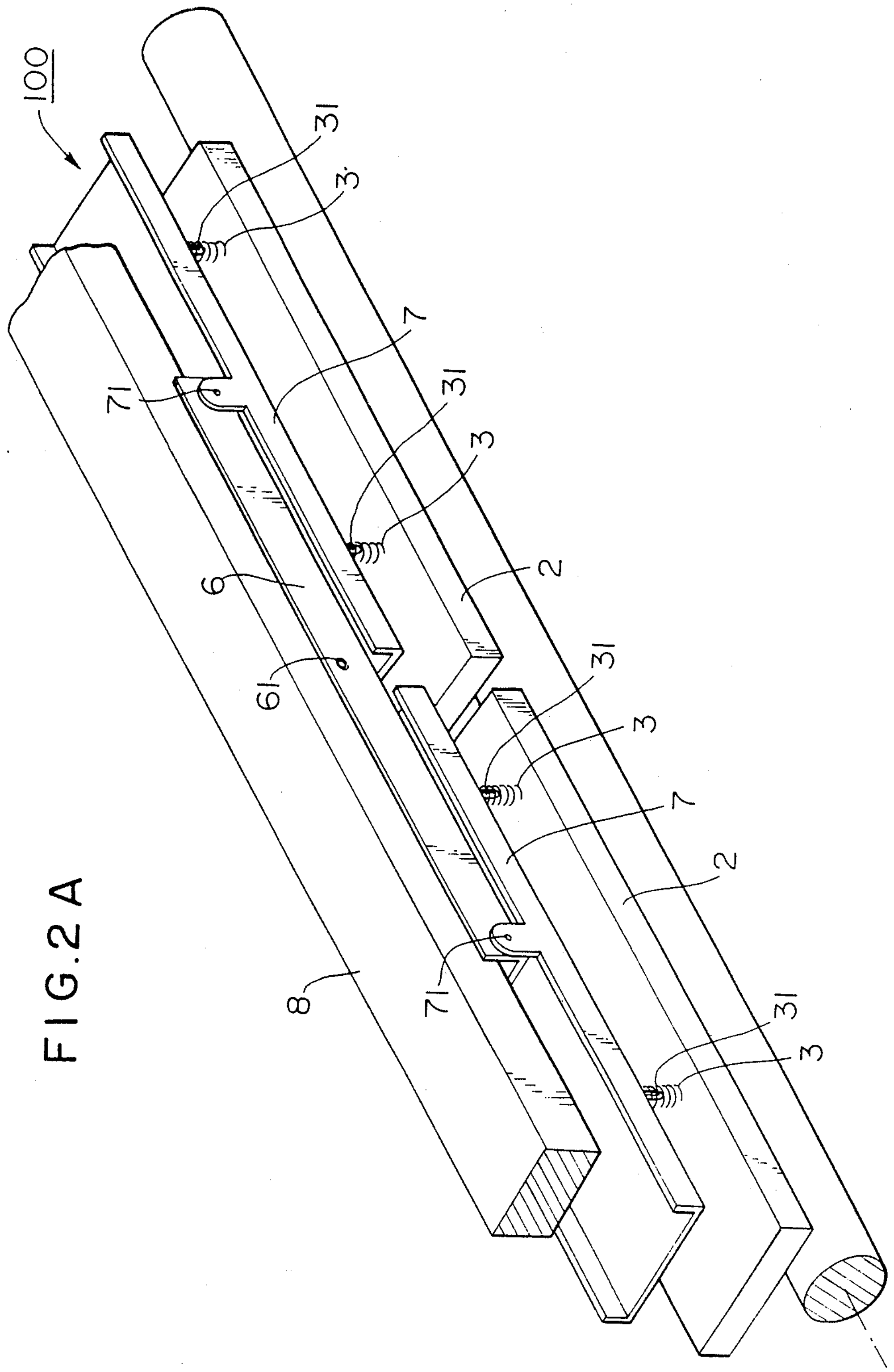
FIG. 2A and 2B perspective views of the head suspension according to the illustrated preferred embodiment of the subject invention in the thermal head supporting means of FIG. 1, with FIG. 2B particularly depicting the positional relationship between the head pressing mechanism and the head supporting mechanism.
Figure 2B:
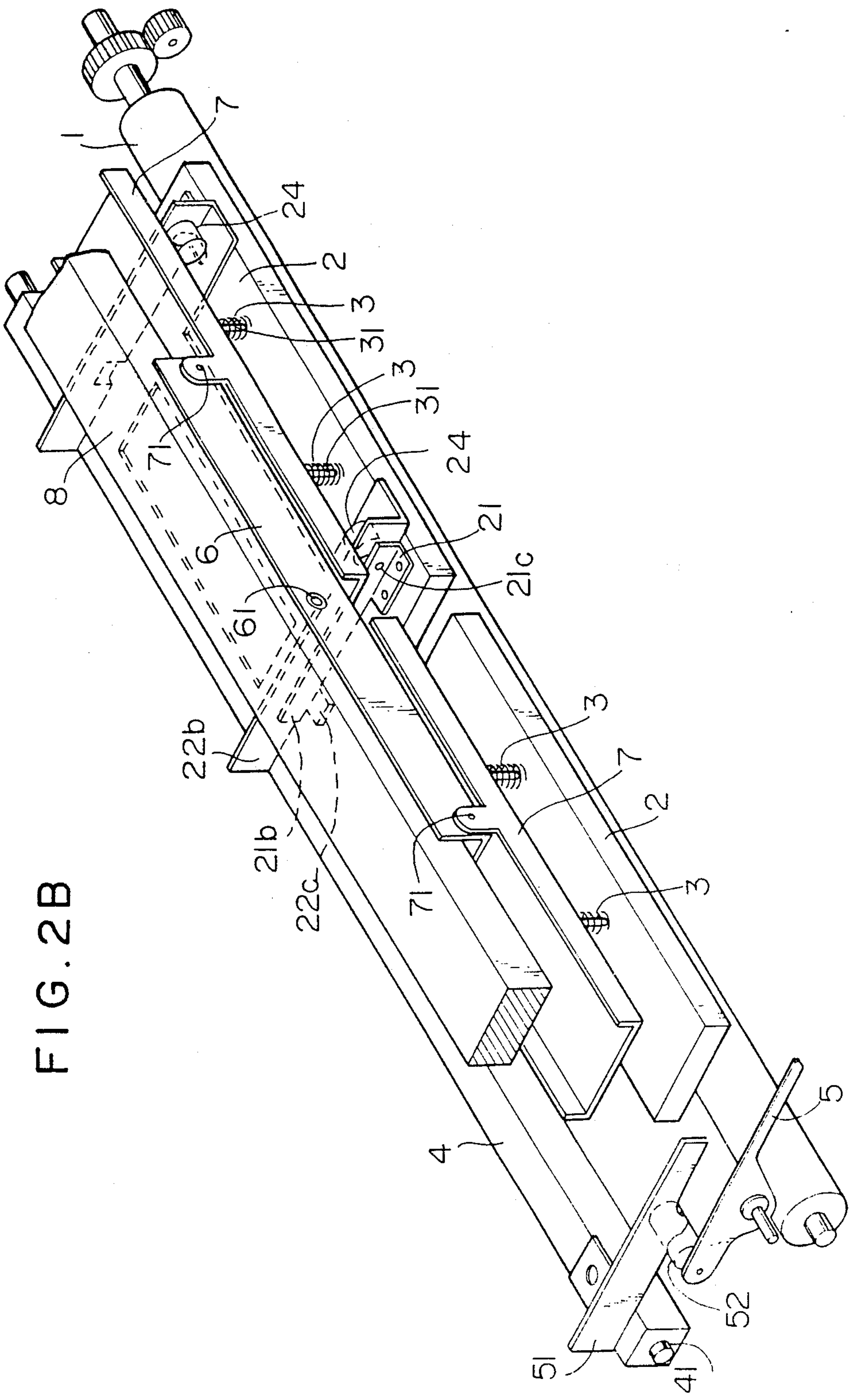
Figure 4:
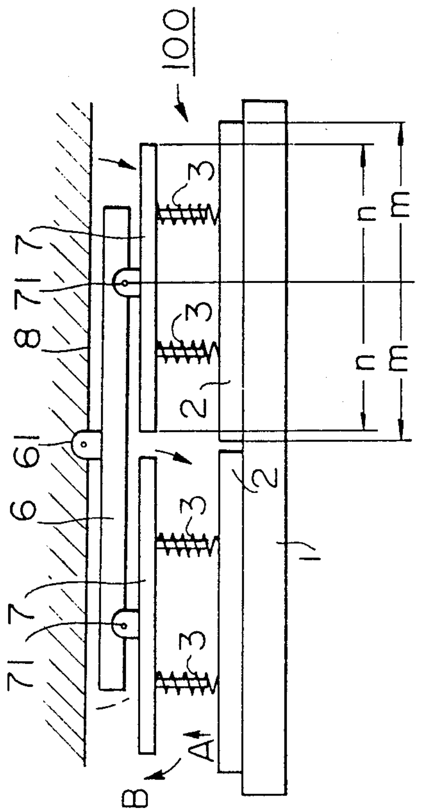
FIG. 4 is a typical frontal view of the head balancing mechanism depicted in FIGS. 2A and 2B.

According to the invention, the two biasing devices 3 are balanced relative to each other opposite the elongate thermal recording head 2, as seen from the recording medium support 1, and as shown by way of example at 7 in FIGS. 2A, 2B, and 4. In terms of structure, these figures show a balancer 7 connected to the two biasing devices opposite each elongate thermal recording head 2, as seen from the recording medium support 1. In this respect, the expression "balancer" is herein employed in the dictionary sense of "a thing that balances."

The balancer herein disclosed includes means for balancing the two biasing devices 3 relative to each other opposite the elongate thermal recording head 2, as seen from the recording medium support. However, the subject invention is not limited to any disclosed structure but includes any suitable balancer in combination with a thermal recording head, recording medium support and head biasing devices. Such means or balancer obviously is different from the means, of the prior art, including, for instance, the above mentioned Boor, Jr. et al Pat. No. 4,151,397, where any and all compression springs independently bias each thermal recording head, inasmuch as each of the two compression springs of the head module is positioned between the fixed module retainer and the movable head module so as to force the thermal print element wafer into contact with the thermally sensitive paper, in that Boor et al patent.

Accordingly, contrary to the prior art, including the above-mentioned Sullivan et al Pat. No. 4,739,344, which also shows each compression spring to be individually supported by a fixed biasing bracket, the currently discussed aspect of the illustrated preferred embodiment of the invention compensates different characteristics of the biasing devices 3 opposite each elongate thermal recording head 2, as seen from the recording medium support 1. Accordingly, the troublesome prior-art problem of producing compression springs of the same size and of the same characteristics, including strength, for thermal recording apparatus has been eliminated by the subject invention.

Forces, such as diagramatically shown by an arrow A in FIG. 4, acting at one end of an elongate thermal recording head 2 against either of the biasing devices are transmitted via both of such biasing devices 3 to an opposite end of that elongate thermal recording head. The above mentioned balancer 7 is used for that purpose.

Movements of the recording medium support 1 at either end of an elongate thermal recording head 2 are transmitted via the biasing devices 3 to an opposite end of that elongate thermal recording head, such as by means of the disclosed balancer 7. In this manner, the subject invention readily compensates practically unavoidable tolerances or variations in effective diameter, circumference and run of the rotary platen or recording medium support 1. The illustrated preferred embodiment of the invention thus effectively compensates even for those tolerances and imperfections which manifest themselves differently at different locations along the recording medium support 1. The balancing of the subject invention thus provides a uniform pressure along each elongate thermal recording head 2 on the recording medium 12, and also provides uniformity of the recording paper run and improved quality of the thermal printing process over prior-art apparatus.

As seen in FIGS. 2A, 2B, and 4, each balancer 7 has a fulcrum 71 at a midpoint relative to the biasing devices 3.

The embodiment of the invention so far disclosed by reference to the drawings may also be employed in the fully illustrated embodiment having more than one thermal recording head. On the other hand, the embodiment presently described herein need not include individual head balancers of the type shown at 7.

In particular, FIGS. 1 to 4 of the drawings illustrate methods and apparatus for recording information with at least two elongate recording heads 2 on a recording medium 12 advancing at least intermittently on the recording medium support 1. These elongate thermal recording heads as shown extend in substantially transverse relation to the recording medium and at substantially fixed position in a transverse extent of the recording medium, such as shown extensively by the prior art, including the above mentioned IBM Technical Disclosure Bulletin article by Markson et al, and by the above mentioned Wysong Pat. No. 4,145,698, Boor, Jr. et al Pat. 4,151,397, and Kaiya et al Pat. No. 4,660,052.

According to the currently disclosed aspect of the invention, the elongate thermal recording heads 2 are interdependently biased against the recording medium 12 at the recording medium support 1 with first biasing means 3 for one of the recording heads 2 and with second biasing means 3 for another of the recording heads 2. These first and second biasing means are balanced relative to each other opposite the elongate thermal recording heads 2, as seen from the recording medium support 1. Again, a balancer 6 may for this purpose be connected to the first and second biasing means 3 opposite the elongated thermal recording heads 2, as seen from the recording medium support 1. That balancer 6 may also have a fulcrum 61 at a midpoint relative to the first and second biasing means.

The balancer 6 may be seen as including means for interdependently balancing the first and second biasing means 3 relative to each other opposite the elongate thermal recording heads 2, as seen from the recording medium support 1. However, it should be understood that the expression "balancer" as set forth in the summary of the invention and in the claims is not intended to be limited for the means shown in the drawings at 6 and 7 and their equivalents.

Moreover, as already indicated, while the balancers 7 may be employed in combination with the main balancer, such main balancer 6 may also be employed within the scope of the invention without a balancing of individual compression springs 3 relative to each other.

However, the drawings, including FIGS. 2A, 2B, and 4, show on the right-hand side thereof first biasing means including first and second biasing devices 3 spaced along one of the elongate thermal recording heads 2, and, at the left-hand side from center, second biasing means including third and fourth biasing devices 3 spaced along another of the elongate thermal recording heads. According to the right-hand side of FIGS. 2A, 2B, and 4, a first balancer 7 is connected to the first and second biasing devices 3 opposite one of the elongate thermal recording heads 2, as seen from the recording medium support. According to the left-hand side of these figures, a second balancer 7 is connected to the third and fourth biasing devices 3 opposite another of the elongate thermal recording heads 2, as seen from the recording medium support 1. According to the preferred embodiment illustrated in these figures, a third balancer 6 is connected to these first and second balancers 7.

As seen in these figures, the third balancer 6 has a first fulcrum 61, the first balancer 7, shown on the right-hand side of these figures, has a second fulcrum 71 connected to the third balancer 6 at a distance from the third fulcrum 61, and the second balancer 7, shown in the left-hand side of these figures, has a third fulcrum 71 connected to the third balancer at a distance from the first and second fulcrums.

In the illustrated preferred embodiment presently under consideration, the first balancer 7 has a fulcrum 71 at a midpoint relative to the first and second biasing devices 3, the second balancer 7 also has a fulcrum 71 at a midpoint relative to the third and fourth biasing devices 3, and the third balancer 6 has a fulcrum 61 at a midpoint between the fulcrums 71 of the first and second balancers 7.

Again, the first, second and third balancers may be seen as means for interdependently biasing the elongate thermal recording heads 2 with the first, second, third and fourth biasing devices 3 shown in the drawings. However, it should again be understood that the broad expression "balancer" is not intended to be limited to these balancing means and to their equivalents.

In either case, movements of the rotating recording medium support 1 at either of the recording heads 2 are readily transmitted via the first and second biasing means to the other of the recording heads. In practice, the subject invention thus provides a uniform pressure along the elongate recording head 2 on the recording medium 12 with the aid of the disclosed balancing features. The subject invention thus provides a truly unified transverse recording facility extending over two or more heads and thereby avoids a major drawback of prior-art multi-head apparatus in which the supposedly unified transverse recording facility was easily broken up into the independently biased recording head segments by practically unavoidable tolerances or variations in diameter, circumference and run of the rotary platen, which manifest themselves differently at different locations along that platen. The subject invention thus substantially improves the uniformity of the recording paper run and the quality of the thermal printing process.

However, an aspect of the illustrated embodiment of the invention greatly increases the access to the inside of the recording station between the recording medium support 1 and the recording heads 2 for various useful purposes, including the initial application of the recording medium 12 to the recording station. That aspect of the illustrated embodiment of the invention also suspends the balancing so far disclosed while temporarily moving the elongate thermal recording heads 2 out of operation away from the recording medium support 1.

In this respect and by way of example, the elongate thermal recording heads 2 may be suspended from a head lifting structure 4 and 22 for lifting these elongate thermal recording heads out of operation away from the recording medium support 1 and against a bias of the biasing devices 3. The illustrated preferred embodiment then provides between each elongate thermal recording head 2 and the head lifting structure 4 and 22 sufficient play, such as at 21 and 22 as shown in FIGS. 1, 2B, 3, 5A, and 5B, for the elongate thermal recording head to follow movements of the recording medium support 1 toward and away from the biasing devices 3 during the recording of information and for the balancing of such multiple biasing devices relative to each other.

However, the currently discussed aspect of the illustrated embodiment takes up such play and lifts with the head lifting structure 4 and 22 the elongate thermal recording heads 2 out of operation away from the recording medium support 1 and against the bias of the biasing devices 3, for increased access to the recording station between the recording medium support 1 and the lifted thermal recording heads 2.

As already indicated to some extent above, the head supporting system according to the subject invention may be used separately, or combined with the head processing mechanism according to the aspect of the invention which will now be described with reference to FIGS. 1 to 5C.

In the drawings, the recording paper feed platen 1 is rotatably supported by opposite side plates (not shown) of a chassis of a thermal recording apparatus through a platen shaft 11 passing through the axial center of the platen 1. The platen 1 is coupled at the opposite ends of its platen shaft 11 to an electric motor (not shown) through transmission gears 13 so that the platen 1 can rotate in a predetermined direction corresponding to the revolution of the motor due to a control signal applied to the motor. On the rear surface in each of thermal heads 2, a pair of hook-shaped members 21 are fixed to each of the thermal heads 2 at two places on a rear surface of the particular thermal head. As shown, these members 21 are fixed at positions near to the longitudinally opposite ends thereof, respectively.

The pair of hook-shaped members 21, 21 are substantially symmetric with respect to a virtual line X—X passing through the center of an thermal element array of the corresponding thermal head 2 and passing through the thermal head 2 in parallel to the feeding direction of recording paper. Each of the hook-shaped members 21 is composed of two parts formed by bending so as to be perpendicular to each other, or in other words, is composed of a base portion 21*a* which is relatively short, and an elongated portion 21*b* which is relatively long. The base portion 21*a* is used to fix the hook-shaped member 21 onto the rear surface of the thermal head 2 as described above.

On the other hand, the elongated portion 21*b* is perpendicularly erect from one side end of the base portion 21*a* and extends substantially horizontally from front to back. A pin 21*c* projecting horizontally from the substantially reverse side with respect to the base portion 21*a* is provided in the frontward portion of the elongated portion 21*b*.

The pin 21*c* is passed through an elongated slot 22*b*1 ranging from an erect portion 22*b* of a head supporting member 22 to a bottom portion thereof, and is fixed by a pin stop 24, so that thus a first engagement portion is formed. In the first engagement portion, the pin 21*c* can be removed from the bottom-portion-side of the elongated slot 22*b*1 by unfastening the pin stop 24 from the pin 21*c* mounted to the hook-shaped member 21*c*. Accordingly, the thermal head 2 can be easily removably attached. On the other hand, in the backward portion of the elongated portion 21*b* of the hook-shaped member 21, the lower side of the elongated portion 21*b* is brought into contact with a projection 22*c* provided at a corresponding position of the erect portion 22*b* of the head supporting member 22, so that a second engagement portion is thus formed. Although this embodiment shows the case where the projection 22*c* is formed by outward horizontally opening a U-shaped notch provided in the vicinity of the backward lower end of the erect portion 22*b*, it is a matter of course that the invention is not limited to the specific embodiment and that, for example, the projection 22*c* may be formed by a U-shaped piece which is provided separately from the erect portion 22*b* of the head supporting member 22 and is fixed to the backward lower end of the erect portion 22*b*. Further, the head supporting member 22 is fixed to a rotatable pillar-shaped member 4 at the backward end of the bottom portion 22*a*. As clearly shown in the drawings, the U-shaped notch 22*b*2, that is, the projection 22*c*, formed in the erect portion 22*b*, is located at a predetermined distance from the elongated slot 22*b*1 provided in the erect portion 22*b*.

Further, a cutaway portion 22*a*3 is formed in the forward end of the bottom portion 22*a* of the head supporting member 22. Furthermore, a window portion 22*a*2 is provided in the center of the bottom portion 22*a* while leaving the backward end thereof. In the head pressing mechanism described below, compression springs 3 for pressing each thermal head 2 are arranged to be contact with the rear surface of the thermal head 2 through the cutaway portion 22*a*3.

In this embodiment, two sets of the same construction each including the head supporting member 22, the pair of hook-shaped members 21 and the thermal head 2 are mounted on the rotatable pillar-shaped member 4. It is however to be understood that the construction illustrated in FIG. 1 is partly omitted for the purpose of avoidance of complexity and that the details thereof are on one set.

The pillar-shaped member 4 is rotatably supported, through a shaft 41, by the opposite side plates (not shown) of the chassis of the recording apparatus. A rod-like transmission member 51 is fixed to the left end portion of the top surface of the pillar-shaped member 4 at a mount portion disposed at the rear end thereof. Further, the transmission member 51 is bent substantially vertically from the mount portion and has a rod-like portion extending from back to front. In the lower side of the rod-like portion, a first cam surface 51*a* and a second cam surface 51*b* are formed so as to be continuous to each other (see FIGS. 1 and 2B). The two cam surfaces 51*a* and 51*b* are provided with the form capable of engaging with a transmission roller 52 provided at the rear end of the turn lever 5. A bearing shaft 53 inserted in a center hole 5*a* of the turnlever 5 is rotatably fixed to the side plates (not shown) of the chassis of the recording apparatus, so that the turnlever 5 can rotate manually in the direction of the arrow in FIG. 1.

When the transmission roller 52 is engaged with the second cam surface 51*b* by turning of the turnlever 5 in the direction of the arrow, the front end of the transmission member 51 turns and ascends in the direction of the arrow. Because the mount portion at the rear end of the transmission member 51 is fixed to the top surface of the rotatable pillar-shaped member 4 as described above, the pillar-shaped member 4 is turned on the shaft 41 in the direction of the arrow. As the result of such turning movement of the pillar-shaped member 4, the head supporting member 22 turns because the backward end thereof is fixed onto the top surface of the pillar-shaped member 4. Accordingly, the thermal head 2 moves upward so that a space with a predetermined distance between the thermal head 2 and the platen 1 is formed. Therefore, the attachment/detachment of thermosensitive recording paper on the platen 1 can be easily made by a human operator In this embodiment, each of the second cam surface 51*b*, the transmission roller 52 and the bearing shaft 53 is provided at a specific position. Accordingly, the turnlever 5 is arranged so that the force thereof is balanced to the transmission member 51 when the transmission roller 52 is engaged with the second cam surface 51*b*. In this embodiment, therefore, it is not necessary to provide any specific lock mechanism in the turnlever.

Figure 1:
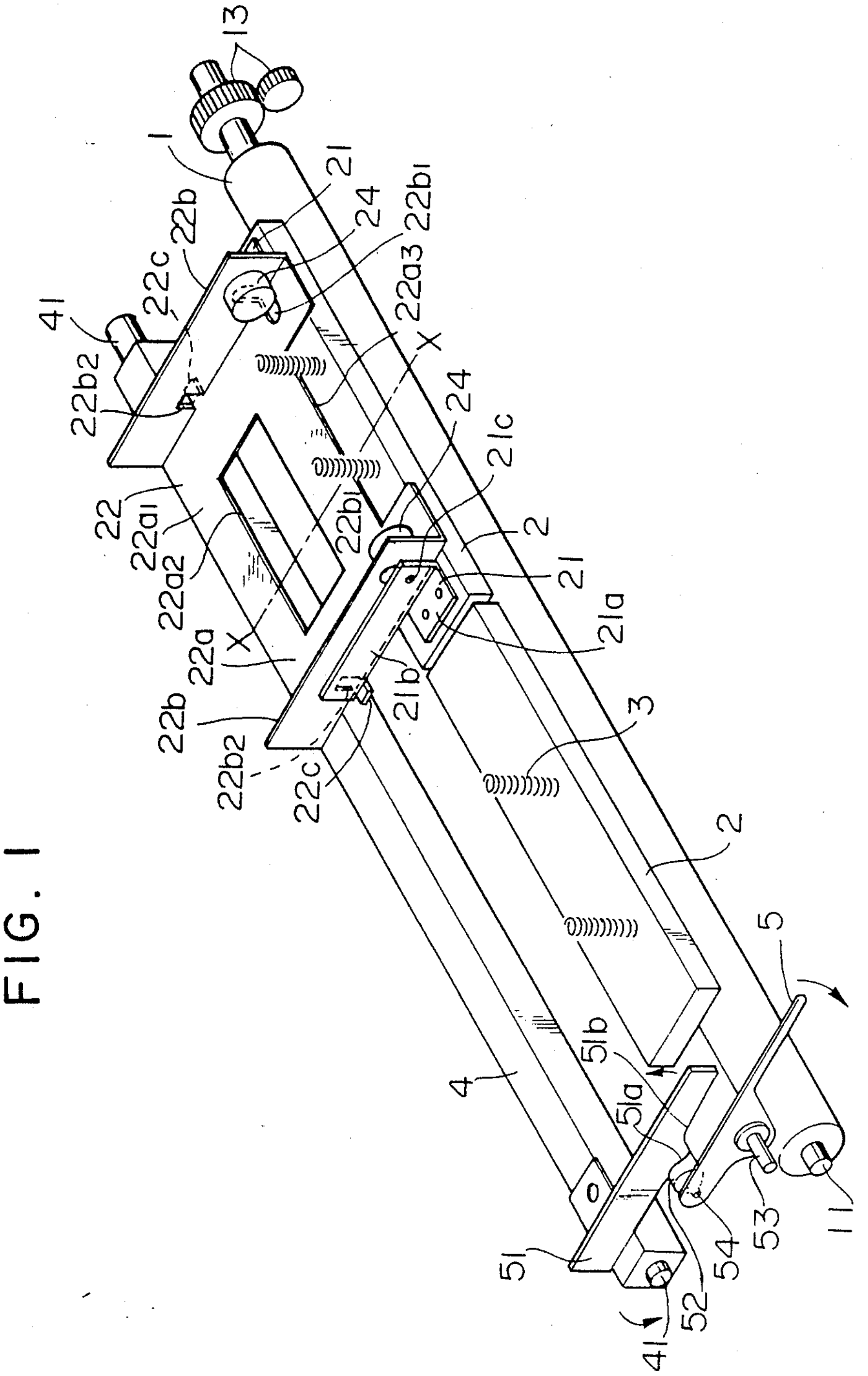
FIG. 1 is a perspective view of part of the head supporting mechanism in the thermal head supporting means according to the illustrated preferred embodiment of the subject invention.
Figure 3:
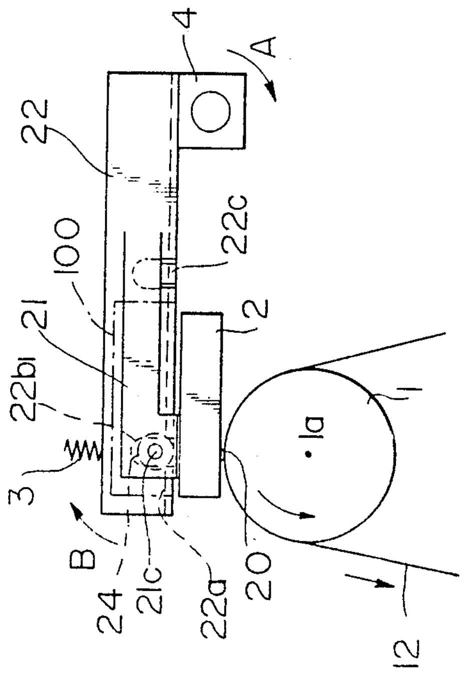
FIG. 3 is a typical side view of the part of the head supporting mechanism depicted in FIG. 1.

FIG. 3 is a side view seen from right of the head supporting mechanism depicted in FIG. 1. When, for example, the shaft 4 is turned in the direction of the arrow A by the turnlever 5, the head supporting member 22 simultaneously moves in the direction of the arrow B. At an initial stage of this case, or in other words, before the pin 21*c* provided in the hook-shaped member 21 fixed to the rear surface of the thermal head 2 is brought into the elongated slot 22*b*1 provided in the erect portion 22*b* of the head supporting member 22, the thermal head 2 does not move.

After the turnlever 5 is further turned so that the pin 21*c* is brought into the elongated slot 22*b*1 by turning of the transmission member and pillar-shaped member, the thermal head 2 moves upward against the urging force of the compression springs 3 provided for pressing the head 2. In the condition of upward movement of the thermal head 2, a space is formed between the thermal head 2 and the platen 1 to enable recording paper 12 to be attached/detached.

In the case where the thermal head 2 is brought into close contact with the platen 1 by turning of the turnlever in the direction reverse to the arrow of FIG. 1, the substantially reverse operation is carried out. In FIG. 3, the thermal head 2 is first brought into contact with the platen 1 by the urging force of the compression springs 3 provided for pressing the head 2, but the pin 21*c* is not brought into the elongated slot 22*b*1 of each of the erect portions 22*b* of the head supporting member 22. For this reason, the hook-shaped members 21 become free from the head supporting member 22. Accordingly, only the urging force of the compression springs 3 acts on the thermal head to thereby loosen the impact of the platen 1 against the thermal head 2.

In this embodiment, the engagement/stopper between the rear end lower portions of the respective hook-shaped members 21 and the corresponding projections 22*c* of the head supporting member 22 function to stop the thermal head 2 from rotating corresponding to the movement of recording paper 12 in the case where, for example, the recording paper 12 is moved in a predetermined direction by the rotation of the platen 1. In this embodiment, a thermal element array 20 of the thermal head 2, the pins 21*c* of the hook-shaped member 21, the elongated slots 22*b*1 of the respective head supporting members 22 and the compression springs 3 are aligned along a straight line passing through a center 1*a* of a circular section of the platen 1, so that the thermal elements in array 20 of the thermal heads 2 can be brought into close contact with recording paper on the platen 1 by substantially uniform urging force over the whole width of the paper.

Figure 5A:
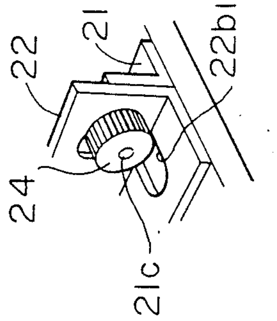
FIGS. 5A, 5B and 5C are enlarged perspective detail views of components of the head supporting mechanism shown in FIG. 1.
Figure 5B:
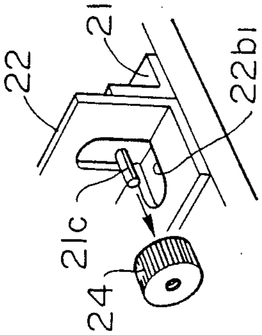
Figure 5C:
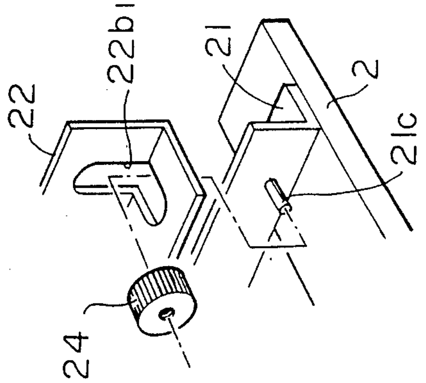

In this embodiment, the diameter of the pin 21*c* of each hook-shaped member 21 is established to be smaller than the width of the corresponding elongated slot 22*b*1 of the head supporting member 22. Because the thermal head 2 is arranged so as to be suspended from the head supporting member 22 as described above, the thermal head 2 has freedom in at least two directions including a rotational direction and a vertical direction, with respect to the head supporting means including the head supporting member 22. By way of example and to make this point more clear, reference is made to FIGS. 5A, 5B and 5C. Referring to FIG. 5A, there is shown a state in which the pin 21*c* and the pin stop 24 are engaged with each other. The state of FIG. 5A corresponds to the state of engagement of FIG. 1 which is formed at each of the pair of side and portions 22*b* of the head supporting member 22 and the respective forward portions of the pair of hook-shaped members 21. When the pin stop 24 in the state of FIG. 5A is turned to unfasten the pin 21*c* as shown in FIG. 5B, the pin 21*c* which has been fixed to the hook-shaped member 22 becomes in a condition in which it can pass vertically through the horizontal portion of the elongated slot 22*b*1 formed in the head supporting member 22. Accordingly, as shown in FIG. 5C, a combination of the thermal head 2 and the pair of hook-shaped members 21 fixed thereto is released downward in the drawing, together with other combinations which are in the same state. In the case where the thermal head 2 is attached, explanation will be made by the quite reverse way. Accordingly, the attachment/detachment of the thermal head 2 can be made easily and speedily.

In the following, the head pressing mechanism in the thermal head supporting means of the present invention is described with reference to FIGS. 2A, 2B and 4. The construction shown in FIG. 2B is substantially similar to that shown in FIG. 2A. Particularly, FIG. 2B is provided to more clarify the three-dimensional relationship in arrangement between the supporting mechanism as described above with reference to FIG. 1 and the head pressing mechanism. For the purpose of avoidance of complexity, the head supporting mechanism as described above with reference to FIGS. 1 and 3 is not shown in FIGS. 2A, 2B and 4. To clarify the relationship between the head pressing mechanism and the head supporting mechanism, a portion corresponding to the head supporting mechanism of FIGS. 2A, 2B and 4 is represented by a block 100 as indicated by a dot-and-dash line in FIG. 3.

In FIGS. 2A and 2B, two head-urging compression springs 3 being in contact with the corresponding thermal head 2 are respectively held by spring holders 31 provided on corresponding one of second movable members 7. Because FIGS. 2A and 2B show the case where two thermal heads 2 are provided, two second movable members 7 are provided corresponding to the respective thermal heads 2. The second movable members 7, 7 are rotatably supported by the first movable member 6 provided commonly to the two second movable members 7 through pivots 71, 71 respectively, at the left and right ends of the first movable member 6 and at positions symmetric with respect to the center of the first movable member 6. The first movable member 6 is rotatably supported, through a pivot 61, by a beam member 8 fixed between the opposite side plates (not shown) of the chassis of the recording apparatus.

The two pivots 71, 71 for supporting the second movable members 7 at the left and right ends of the first movable member 6 are at an equal distance from the pivot 61 for pivotally supporting the first movable member 6. The two head-urging compression springs 3, 3 provided to the corresponding second movable member 7 are at an equal distance from the corresponding pivot 71 for pivotally supporting the second movable member 7 on the first movable member 6.

Referring to FIG. 4 in which the construction of the head pressing mechanism is illustrated as a model, it is apparent that substantially uniform urging force due to the two compression springs 3 acts on the corresponding thermal head 2. On the other hand, substantially uniform urging force acts on the corresponding second movable member 7 supporting the two compression springs 3 in the same manner. Accordingly, if four head-urging compression springs 3 are arranged to be equalized in strength, the most stable condition can be attained in the case of FIG. 4 or in other words when the first movable member 6 and the second movable members 7 are parallel to the two thermal heads 2.

Practically, it is very difficult to obtain four compression springs 3 exactly having the same size and same characteristic, especially same strength. The attempt to produce compression springs of the same size and same characteristic is attendant on various troublesome manufacturing problems. However, according to the invention, the urging force acting on the thermal heads 2 through the four compression springs 3 is always kept uniform for the following reason even if there are variations in size and strength among the four springs 3.

When, for example, upward force as shown by the arrow A in FIG. 4 is applied to the left-hand side of the left-hand head 2, that force urges the left-side second movable member 7 to turn in the direction of the arrow B about the pivot 71. Then the left-hand one of the two compression springs 3 is urged to stay at the current position, whereas the right one thereof is urged to return to the original position. When, for example, a downward force as shown by the dot-line arrow in FIG. 4 is applied to the right end or left end of the first movable member 6, the right-side second movable member 7 moves downward to thereby urge the corresponding pair of compression springs 3 to move in the direction of the dot-line arrow. Accordingly, the right-side compression springs 3 are urged to stay at the current position. As this result, the second movable members 7 can be kept in a stable position. While the left end of the first movable member 6 is urged to move upward as shown by the dot-line arrow, the left-side second movable member 7 is urged to move also upward. Then the pair of compression springs 3 corresponding to the left-side second movable member 7 are urged to expand against the compressing force thereof, so that the compression springs 3 are urged to return to the original position. Accordingly, the first movable member 6 can be kept in a stable state. As described above, according to this embodiment, the head pressing mechanism 100 including the compression springs 3, the second movable members 7 and the first movable member 6 functions to keep the movable members in a stable state at all times, so that that urging force given to the respective thermal heads can be kept uniform.

It is apparent from the above description that, according to the illustrated preferred embodiment of the invention, the head supporting member for rotatably supporting the corresponding thermal head is arranged to be supported by the hook-shaped members having two engagement portions having freedom, and that very good head-contacting property and space-retaining property can be attained by a relatively simple construction in the thermal recording apparatus having a plurality of thermal heads. Furthermore, pursuant to the invention, predetermined urging force is given to each of the thermal heads through the second movable member having a plurality of head-urging compression springs symmetrically disposed thereon and the first movable members for keeping the second movable members in symmetric positions, so that uniform urging force can be given to all of the thermal heads even with the relatively simple construction herein shown.

The subject extensive disclosure will render apparent or suggest to those skilled in the art various modifications and variations within the spirit and scope of the subject invention and equivalents thereof.

We claim:

1. In a method of recording information with at least one elongate thermal recording head on a recording medium advancing at least intermittently on a recording medium support, and being pressed against the recording medium at the recording medium support by at least two biasing devices spaced along said elongate thermal recording head, the improvement, in combination with said elongate thermal recording head, recording medium support and biasing devices, of:
   interdependently balancing said two biasing devices relative to each other at a side opposite said elongate thermal recording head, as seen from said recording medium support.

2. A method as in claim 1, wherein:
   different characteristics of said biasing devices are compensated opposite said elongate thermal recording head, as seen from said recording medium support.

3. A method as in claim 1, wherein:
   forces acting at one end of said elongate thermal recording head against either of said biasing devices are transmitted via both of said biasing devices to an opposite end of said elongate thermal recording head.

4. A method as in claim 1, wherein:
   movements of said recording medium support at either end of said elongate thermal recording head are transmitted via said biasing devices to an opposite end of said elongate thermal recording head.

5. A method as in claim 1, including the step of:
   providing a uniform pressure along said elongate thermal recording head on said recording medium with the aid of said balancing.

6. A method as in claim 1, including the step of:
   suspending said balancing while temporarily moving said elongate thermal recording head out of operation away from said recording medium support.

7. A method as in claim 1, including the steps of:

suspending said elongate thermal recording head from a head lifting structure for lifting said elongate thermal recording head out of operation away from said recording medium support and against a bias of said biasing devices;

providing between said elongate thermal recording head and said head lifting structure sufficient play for said elongate thermal recording head to follow movements of said recording medium support toward and away from said biasing devices during said recording of information and for said balancing of said two biasing devices relative to each other; and taking up said play and lifting with said head lifting structure said elongate thermal recording head out of operation away from said recording medium support and against said bias of the biasing devices.

8. In a method of recording information with at least two elongate thermal recording heads on a recording medium advancing at least intermittently on a recording medium support, said elongate thermal recording heads extending in substantially transverse relation to the recording medium and at substantially fixed positions in a transverse extent of the recording medium, the improvement comprising in combination the steps of:

interdependently biasing said elongate thermal recording heads against the recording medium at the recording medium support with first biasing means for one of said elongate recording heads and with second biasing means for another of said elongate recording heads; and interdependently balancing said first and second biasing means relative to each other at a side opposite said elongate thermal recording heads, as seen from said recording medium support.

9. A method as in claim 8, wherein:

movements of said recording medium support at either of said recording heads are transmitted via said first and second biasing means to the other of said recording heads.

10. A method as in claim 8, including the step of:

providing a uniform pressure along said elongate recording heads on said recording medium with the aid of said balancing.

11. A method as in claim 8, including the step of:

suspending said balancing while temporarily moving said elongate thermal recording heads out of operation away from said recording medium support.

12. A method as in claim 8, including the steps of:

providing said first biasing means with first and second biasing devices;

balancing said first and second biasing devices relative to each other;

providing said second biasing means with third and fourth biasing devices; and balancing said third and fourth biasing devices relative to each other.

13. A method as in claim 12, wherein:

said first, second, third and fourth biasing devices are balanced relative to one another.

14. In apparatus for recording information with at least one elongate thermal recording head on a recording medium advancing at least intermittently on a recording medium support relative to a fixed support, the elongate thermal recording head being pressed against the recording medium by at least two biasing devices spaced along the elongate thermal recording head, the improvement comprising, in combination with said thermal recording head, recording medium support and biasing devices:

a balancer movable relative to said fixed support and connected to the two biasing devices opposite said elongate thermal recording head, as seen from said recording medium support.

15. Apparatus as in claim 14, wherein:

said balancer has a fulcrum at a midpoint relative to said biasing devices.

16. Apparatus as in claim 14, including:

a head lifting structure; and play between said head lifting structure and the elongate thermal recording head.

17. Apparatus as in claim 14, wherein:

said balancer includes means for interdependently balancing said two biasing devices relative to each other opposite said elongate thermal recording head, as seen from said recording medium support.

18. In apparatus for recording information with at least two elongate thermal recording heads on a recording medium advancing at least intermittently on a recording medium support relative to a fixed support, said elongate thermal recording heads extending in substantially transverse relation to the recording medium and at substantially fixed positions in a transverse extent of the recording medium, and being pressed against the recording medium by first and second biasing means, respectively, the improvement comprising in combination with said thermal recording heads, recording medium support and biasing means:

a balancer movable relative to said fixed support and connected to the first and second biasing means opposite said elongate thermal recording heads, as seen from said recording medium support.

19. Apparatus as in claim 18, wherein:

said balancer has a fulcrum at a midpoint relative to said first and second biasing means.

20. Apparatus as in claim 18, wherein:

said balancer includes means for interdependently balancing said first and second biasing means relative to each other opposite said elongate thermal recording heads, as seen from said recording medium support.

21. In apparatus for recording information with at least two elongate thermal recording heads on a recording medium advancing at least intermittently on a recording medium support, said elongate thermal recording heads extending in substantially transverse relation to the recording medium and at substantially fixed positions in a transverse extent of the recording medium, and being pressed against the recording medium by first and second biasing means respectively, said first biasing means including first and second biasing devices spaced along one of said elongate thermal recording heads, and said second biasing means including third and fourth biasing devices spaced along another of said elongate thermal recording heads, the improvement comprising, in combination with said thermal recording heads, recording medium support and biasing means:

a first balancer connected to said first and second biasing devices opposite one of said elongate thermal recording heads, as seen from said recording medium support;

a second balancer connected to said third and fourth biasing devices opposite another of said elongate thermal recording heads, as seen from said recording medium support; and a third balancer connected to said first and second balancers.

22. Apparatus as in claim 21, wherein:

said third balancer has a first fulcrum;

said first balancer has a second fulcrum connected to said third balancer at a distance from said first fulcrum; and said second balancer has a third fulcrum connected to said third balancer at a distance from said first and second fulcrums.

23. Apparatus as in claim 21, wherein:

said first balancer has a fulcrum at a midpoint relative to said first and second biasing devices;

said second balancer has a fulcrum at a midpoint relative-to said third and fourth biasing devices; and said third balancer has a fulcrum at a midpoint between the fulcrums of said first and second balancers.

24. Apparatus as in claim 21, wherein:

said first, second and third balancers include means for interdependently biasing said elongate thermal recording heads with said first, second, third and fourth biasing devices.

* * * * *